United States Patent
Sargenti, Jr. et al.

(10) Patent No.: US 7,934,030 B1
(45) Date of Patent: Apr. 26, 2011

(54) DISK DRIVE COMPRISING CODE SEGMENTS FOR INTERFACING WITH A COMPONENT SUCH AS A READ CHANNEL

(75) Inventors: William A. Sargenti, Jr., Lake Forest, CA (US); Paul C. Santa Ana, Orange, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 499 days.

(21) Appl. No.: 12/031,442

(22) Filed: Feb. 14, 2008

(51) Int. Cl.
*G06F 13/12* (2006.01)

(52) U.S. Cl. .......................................... 710/74

(58) Field of Classification Search .................. None
See application file for complete search history.

(56) References Cited

U.S. PATENT DOCUMENTS

| | | | | |
|---|---|---|---|---|
| 6,529,973 | B1 * | 3/2003 | Spaur | 710/60 |
| 6,763,327 | B1 | 7/2004 | Songer et al. | |
| 6,907,482 | B2 | 6/2005 | Maciesowicz | |
| 6,987,630 | B1 * | 1/2006 | Higgins et al. | 360/31 |
| 6,996,501 | B1 * | 2/2006 | Rothberg | 702/186 |
| 7,182,250 | B2 | 2/2007 | Kelly et al. | |
| 7,257,650 | B2 | 8/2007 | Maciesowicz | |
| 7,265,937 | B1 * | 9/2007 | Erden et al. | 360/78.14 |
| 2003/0151403 | A1 * | 8/2003 | Yun Yun et al. | 324/210 |
| 2003/0184783 | A1 | 10/2003 | Shahindoust et al. | |
| 2004/0169947 | A1 | 9/2004 | Yun et al. | |
| 2004/0226025 | A1 | 11/2004 | Beaudoin et al. | |
| 2005/0144436 | A1 | 6/2005 | Chen et al. | |
| 2005/0198596 | A1 | 9/2005 | Oshins et al. | |
| 2005/0289510 | A1 | 12/2005 | Illowsky et al. | |
| 2007/0112441 | A1 | 5/2007 | Shahindoust et al. | |
| 2007/0260758 | A1 * | 11/2007 | Yen | 710/5 |

OTHER PUBLICATIONS

Minsky et al., Multi-Route Access to Information Stored on Rotating-Mass-Storage Devices, 1971, IP.com, pp. 1-42.*
A 24 MBIT/S 1,7 Read Channel Combo for Disk-Drive Applications, 1993, IEEE, pp. 1-4.*

* cited by examiner

*Primary Examiner* — Eron J Sorrell

(57) ABSTRACT

A disk drive is disclosed comprising a disk, a head actuated over the disk, and a read channel for processing a read signal generated by the head. The disk drive further comprises a plurality of code segments including a read channel interface procedure having an input parameter comprising a pointer to a data structure. The data structure comprises a command ID identifying one of a plurality of routines, input data for use by the routine identified by the command ID, a pointer to a data structure for use by the routine identified by the command ID, and output data returned by the routine identified by the command ID.

20 Claims, 6 Drawing Sheets

```
RC_Hal(&RCHALStruct);      // Read Channel Interface Procedure typedef struct
{
    UINT32 RCHALCmd;       // Command ID
    UINT32 InputData1;     // Input data required by routine to be executed
    UINT32 InputData2;     // Input data required by routine to be executed
    void *pData1;          // Pointer to a data structure that is used by routine to be executed
    UINT32 ReturnData1;    // Output data stored by executed routine
    UINT32 ReturnData2;    // Output data stored by executed routine
    UINT16 ReturnStatus;   // Status from executed routine, 0x00 = Success
} RC_HalData_t;
```

FIG. 2A

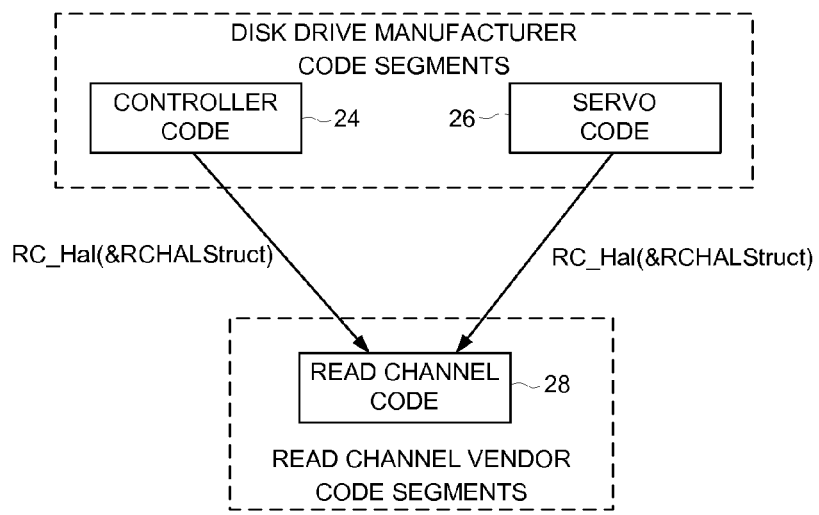

FIG. 2B

| Command | Description |
| --- | --- |
| SetMode | Set up channel for various channel mode (i.e. IBI, ARCO, ...). |
| DeviceInit | Initialize Read Channel device after power up. |
| MediaNoise_Access | Set up access to media noise parameters. |
| InitServo | Initialize servo DACs RAM table from ROM defaults. |
| SeekSetup | Update channel parameters for new servo zone and head. |
| SelectMrBias | Update MR bias with same head selected. |
| ServoUpdate | Update channel parameters ONLY for the new servo zone and head. |
| DataUpdate | Update channel parameters for disk write or read operation. |
| DeviceReset | Recover from a pre-empted event due to reset or otherwise, RC device will be reset, re-initialized, and TBG recalibrated and default register values are reloaded. |
| SetBfrPage | Setup the buffer page for channel parameters access. |
| AdjustSDM | Adjust servo channel detection according to servo operation. |
| ForceSW | Force servo to lose bursts sync prior to re-start soft wedge. |
| SSMD | Start or Stop servo search mode for servo frame sync mark. |
| ServoGainCal | Perform servo gain calibration and return gain calibration values for all heads in ServoGainCal[HeadCount]. |
| SoftWedge | Init channel softwedge registers to try to synch with Servo burst. |
| WRROExit | Exit RRO write mode. |
| WRRORead | Read RRO data from disk. |
| WRROSetup | Set up channel device for RRO write to disk for the specified track. |

FIG. 3A

| Command | Description |
| --- | --- |
| WRROWrite | Send RRO data to channel device for writing to disk. RRO data will be written to disk on the next servo gate. |
| WRROIwSetup | Set the write current according to head and zone. |
| CheckTAStatus | Return the current data TA detection flag state from channel device. |
| GetVersionID | Return channel vendor ID and revision. |
| ReadVGAGain | Return data and servo gain value in the current zone. |
| ReadServoBurst | Read servo burst values. |
| CheckCmdComplete | Read channel to determine if command has completed. |
| MMS | Read MMS data. |
| UpdateWPC | Update the Write Precomp registers. |
| DeviceCal | Calibrate read channel device after power up. |
| ReadAuxVoltage | Perform ADC conversion for PCBA identification using AUX input. |
| SetupMra | Modify MRA register for Data Error Recovery. |
| ToneScanSetup | Initialize tone scan parameters and write them to RC device for IBI. |
| InitMediaNoise | Initialize Media Noise parameters. |
| GetSynctoServo | Read the STS2 values. |
| UpdateRegs | Write register values using list of register addresses. |
| RegWrite | Write the channel register. |
| RegRead | Read the channel register. |
| DeviceRegsWrite | Write the entire 256 byte-registers to the device and also update the overlapped zone parameters in RAM. |

FIG. 3B

```
UINT (* const TblSTChHAL [])( tRCHALCmd * ) =
{
        &SetMode, // 00h - Set up channel for various channel mode
        &DeviceInit, // 01h - Initialize Read Channel device after power up
        &RC_HAL_Default, // 02h - MediaNoise_Access not supported
        &InitServo, // 03h - Initialize servo DACs RAM table from ROM defaults
        &SeekSetup, // 04h - Update channel parameters for new servo zone and head
        &DataUpdate, // 05h - Update channel parameters for disk write or read operation
        &DeviceReset, // 06h - Recover from a pre-empted event
        &RC_HAL_Default, // 07h - SetBfrPage not supported
}
```

FIG. 4

| Constant Name | Constant Value | Description |
|---|---|---|
| PA_PWR_SLEEP_MODE | 0x00 | Sleep mode. |
| PA_PWR_ACTIVE_MODE | 0x01 | Active/normal mode. |
| PA_PWR_AVAILABLE | 0x02-0xFF | Available for expansion. |

FIG. 5

Void pa_SetPwrMode( UINT8 ubMode )

UINT8 pa_GetPwrMode( void )

FIG. 6

DISK DRIVE COMPRISING CODE SEGMENTS FOR INTERFACING WITH A COMPONENT SUCH AS A READ CHANNEL

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

The control circuitry of the disk drive typically comprises various components, such as a read channel or a preamp which may be developed by vendors that supply disk drive manufacturers. The preamp generates the write signal applied to the head during write operations, and amplifies the read signal generated by the head during read operations. The read channel performs suitable encoding of the data written to the disk, and demodulates the read signal into an estimated data sequence representing the data recorded on the disk. The read channel may also perform various functions associated with the servo system for servoing the head over the disk, such as servo sector processing.

A problem arises when a disk drive manufacturer engages a new component vendor, such as a read channel vendor or preamp vendor. The new vendor typically needs to evaluate how the current vendors implement the code segments for interfacing with the disk drive in order to understand and implement interoperability with the disk drive. However, the code segments for implementing the component interface may include proprietary information owned by the current vendors and therefore cannot be disclosed to a new vendor.

BRIEF DESCRIPTION OF THE DRAWINGS

FIG. 2A shows a data structure according to an embodiment of the present invention which is an input parameter to a read channel interface procedure.

FIG. 2B shows an embodiment of the present invention wherein the disk drive comprises disk drive manufacturer code segments which calls the read channel interface procedure, and read channel vendor code segments which implement the read channel interface procedure.

FIGS. 3A and 3B show a table of read channel commands according to an embodiment of the present invention.

FIG. 4 shows a vector table of routines that correspond to the read channel commands according to an embodiment of the present invention.

FIG. 5 is a table of constants for configuring the preamp according to an embodiment of the present invention.

FIG. 6 shows a set power mode procedure and a get power mode procedure for the preamp.

DETAILED DESCRIPTION OF EMBODIMENTS OF THE INVENTION

Figure 1A:
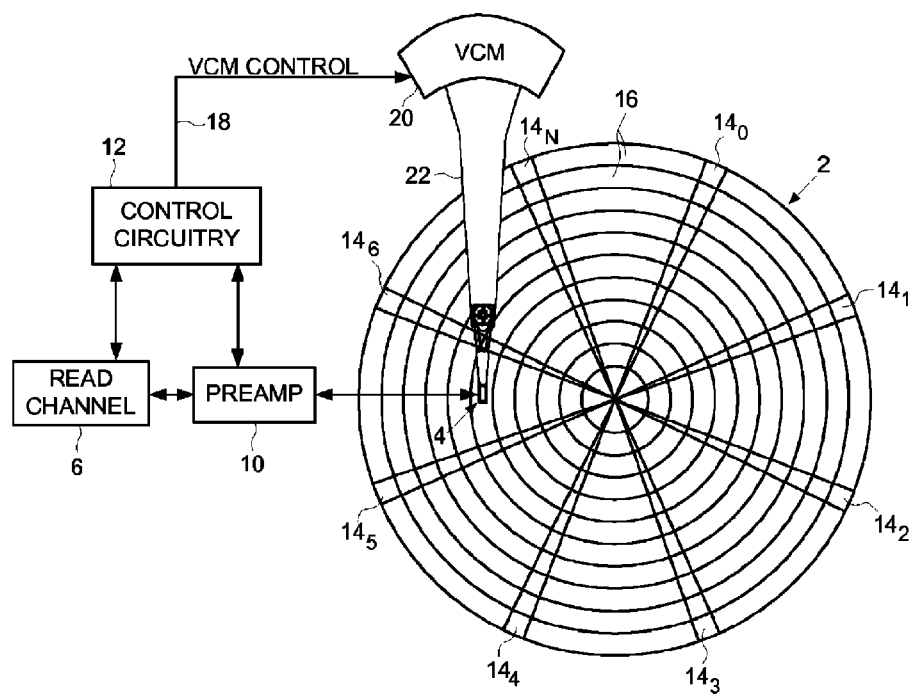
FIG. 1A shows a disk drive according to an embodiment of the present invention comprising a disk, a head actuated over the disk, and control circuitry including a read channel and a preamp.

FIG. 1A shows a disk drive according to an embodiment of the present invention comprising a disk 2, a head 4 actuated over the disk 2, and a read channel 6 for processing a read signal generated by the head 4. The disk drive further comprises a plurality of code segments including a read channel interface procedure having an input parameter comprising a pointer to a data structure. FIG. 2A shows an embodiment wherein the read channel interface procedure is named RC_Hal and the data structure is named RC_HalData_t. As shown in FIG. 2A, the data structure comprises a command ID identifying one of a plurality of routines, input data for use by the routine identified by the command ID, a pointer to a data structure for use by the routine identified by the command ID, and output data returned by the routine identified by the command ID.

In the embodiment of FIG. 1A, the disk drive comprises a preamp 10 and control circuitry 12 for implementing control aspects of the disk drive. In addition, the disk 2 comprises a plurality of embedded servo sectors $14_0$-$14_N$ that define the data tracks 16. The control circuitry 12 processes a read signal emanating from the head 4 to demodulate the embedded servo sectors $14_0$-$14_N$ and generate a position error signal (PES) representing a radial offset of the head 4 from a target track 16. The control circuitry 12 processes the PES with a suitable servo compensator to generate a control signal 18 applied to a voice coil motor (VCM) 20. The VCM 20 rotates an actuator arm 22 about a pivot in order to actuate the head 4 radially over the disk 2 in a direction that decreases the PES.

Figure 1B:
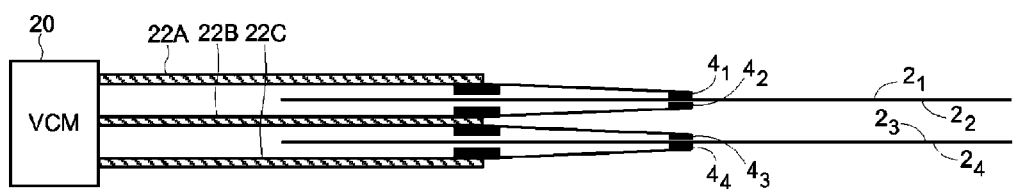
FIG. 1B shows a side view of the disk drive comprising a plurality of disks with respective heads actuated over each disk surface.

FIG. 1B shows a side view of a disk drive according to an embodiment of the present invention comprising a plurality of disks defining a plurality of disk surfaces $2_1$-$2_4$ with respective heads $4_1$-$4_4$ actuated over each disk surface by respective actuator arms 22A-22C. In one embodiment, the preamp 10 comprises suitable circuitry for selecting one of the heads $4_1$-$4_4$ for read/write operations, and in one embodiment, for configuring various control signals, such as a read bias current or dynamic fly height setting.

FIG. 2B illustrates an embodiment of the present invention wherein a disk drive manufacturer implements a plurality of code segments executed by the control circuitry 12, for example, code segments for implementing controller code 24 and code segments for implementing servo code 26. The disk drive manufacturer code segments fill out the data structure of FIG. 2A with appropriate parameter values and then call the read channel interface procedure (RC_Hal) in order to interface with the read channel 6. The code segments further comprise read channel code segments 28 implemented by a read channel vendor. In this manner, when a disk drive manufacturer engages a new read channel vendor, the new read channel vendor need only implement the read channel code segments 28 in order to be compatible with the existing code segments in the controller code 24 and servo code 26. In addition, the new read channel vendor need not evaluate the existing code segments implemented by other read channel vendors, and therefore a new read channel vendor need not see proprietary code segments owned by other read channel vendors.

The command ID in the data structure of FIG. 2A may identify any suitable command associated with configuring the read channel 6. FIGS. 3A and 3B show a table of several example commands, wherein in one embodiment each command is identified using a predetermined constant which corresponds to a routine implemented in the read channel code 28. Some of the routines identified by the command IDs shown in FIGS. 3A and 3B include a routine for setting an operating mode of the read channel (SetMode), a routine for initializing the read channel (DeviceInit), a routine for selecting a read bias for a selected one of the heads (SelectMRBias), a routine for reading repeatable runout (RRO) data from the disk (WRRORead), a routine for writing repeatable runout (RRO) data to the disk (WRROWrite), a routine for returning a vendor ID of the read channel (GetVersionID), and a routine for returning a variable gain amplifier (VGA) setting for the head (ReadVGAGain).

The read channel code 28 may implement each command identified in the data structure of FIG. 2A in any suitable manner. In one embodiment, the read channel code 28 implements a vector table, an example of which is shown in FIG. 4. The vector table is indexed by the command ID and returns a corresponding pointer to the routine implemented within the read channel code 28. If a particular command ID is not implemented by the read channel code 28, then the entry in the vector table points to a default routine (RC_HAL_Default) which returns a suitable indication to the disk drive manufacturer code segments.

In another embodiment of the present invention, the code segments within the disk drive further include a set power mode procedure for setting a power mode of the preamp 10 (pa_SetPwrMode in FIG. 6), wherein the set power mode procedure includes an input constant selected from a mode group comprising (as shown in FIG. 5):

0x00—corresponding to a sleep mode; and
0x01—corresponding to a normal mode.

When the controller code 24 desires to put the preamp 10 in a particular power mode, it calls the set power mode procedure with the appropriate constant. A preamp vendor can then implement the set power mode procedure without needing any further information other than the above constants defined in the mode group. That is, a new preamp vendor does not need to evaluate another vendor's preamp code in order to implement interoperability with the disk drive manufacturer code segments.

FIG. 6 also shows that in one embodiment the code segments further comprise a get power mode procedure for getting the current power mode of the preamp 10 (pa_GetPwrMode). The get power mode procedure simply returns the constant value corresponding to the power mode, such as one of the constants defined in the table of FIG. 5.

Figure 7:
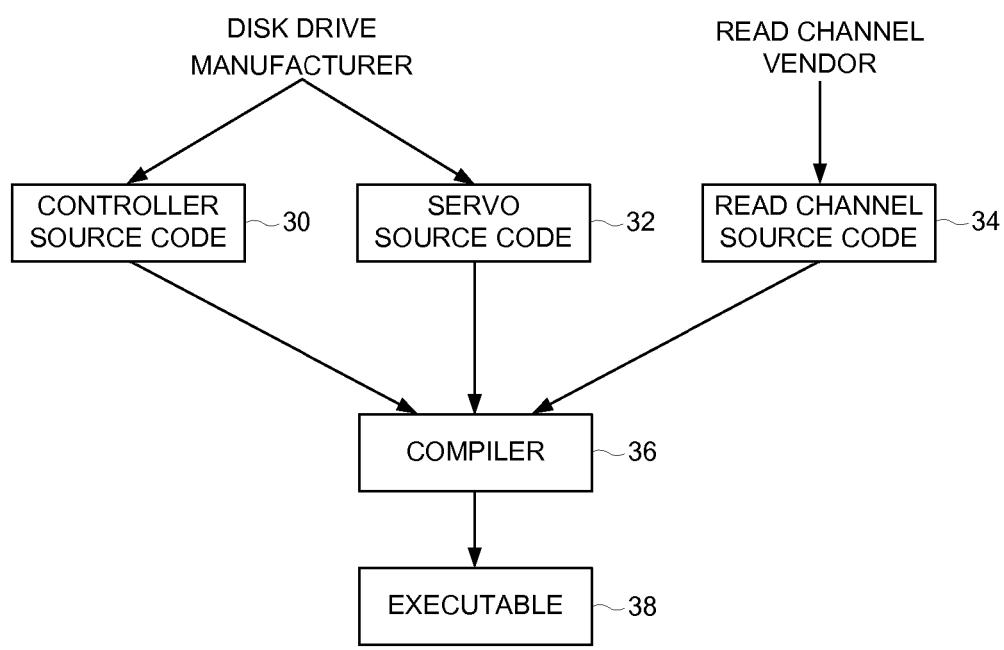
FIG. 7 shows an embodiment of the present invention wherein a disk drive manufacturer develops controller and servo source code, a read channel vendor develops read channel source code, and a compiler compiles both into an executable file.

FIG. 7 shows an embodiment of the present invention wherein a disk drive manufacturer writes controller source code 30 and servo source code 32 including calls to the above described read channel interface procedure. A read channel vendor writes the read channel source code 34 in compliance with the above described protocol for implementing the read channel interface procedure, including the routines that correspond to the commands in the data structure of FIG. 2A, such as the commands shown in FIGS. 3A and 3B. A compiler 36 then compiles the disk drive manufacturer source code and the read channel vendor source code into an executable file 38 that is copied to a production disk drive. For example, the executable file 38 may be written to the disk 2 of the production disk drive which is then read from the disk and executed by the control circuitry 12 during normal operation. When the disk drive manufacturer engages a new read channel vendor, the new read channel vendor simply writes the protocol compliant read channel source code 34 which is then recompiled with the disk drive manufacturer source code to generate a new executable file. In one embodiment, the preamp vendors provide similar preamp source code which is also compiled with the disk drive manufacturer source code to generate the executable file 38.

Any suitable control circuitry 12 may be employed in the embodiments of the present invention, such as any suitable integrated circuit or circuits. For example, the control circuitry 12 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 12 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 2 and read into a volatile semiconductor memory when the disk drive is powered on. In yet another embodiment, the control circuitry 12 comprises suitable logic circuitry, such as state machine circuitry.

What is claimed is:

1. A disk drive comprising:
  a disk;
  a head actuated over the disk;
  a vendor specific read channel for processing a read signal generated by the head; and
  a plurality of code segments comprising a generic read channel interface procedure call for interfacing with the vendor specific read channel, the generic read channel interface procedure call having an input parameter comprising a pointer to a data structure, the data structure comprising:
    a command ID identifying one of a plurality of routines;
    input data for use by the routine identified by the command ID;
    a pointer to a data structure for use by the routine identified by the command ID; and
    output data returned by the routine identified by the command ID.

2. The disk drive as recited in claim 1, wherein the command ID identifies a routine for setting an operating mode of the read channel.

3. The disk drive as recited in claim 1, wherein the command ID identifies a routine for initializing the read channel.

4. The disk drive as recited in claim 1, wherein the command ID identifies a routine for selecting a read bias for the head.

5. The disk drive as recited in claim 1, wherein the command ID identifies a routine for reading repeatable runout (RRO) data from the disk.

6. The disk drive as recited in claim 1, wherein the command ID identifies a routine for writing repeatable runout (RRO) data to the disk.

7. The disk drive as recited in claim 1, wherein the command ID identifies a routine for returning a vendor ID of the read channel.

8. The disk drive as recited in claim 1, wherein the command ID identifies a routine for returning a variable gain amplifier (VGA) setting for the head.

9. The disk drive as recited in claim 1, further comprising a vendor specific preamp for amplifying the read signal, wherein the code segments further comprise a generic set power mode procedure call for setting a power mode of the vendor specific preamp, wherein the generic set power mode procedure call includes an input constant selected from a mode group comprising:
0x00—corresponding to a sleep mode; and
0x01—corresponding to a normal mode.

10. A disk drive comprising:
a disk;
a head actuated over the disk;
a vendor specific preamp for amplifying a read signal generated by the head to generate an amplified read signal; and
a plurality of code segments comprising a generic set power mode procedure call for setting a power mode of the vendor specific preamp, wherein the generic set power mode procedure call includes an input constant selected from a mode group comprising:
0x00—corresponding to a sleep mode; and
0x01—corresponding to a normal mode.

11. A method of operating a disk drive, the disk drive comprising a disk, a head actuated over the disk, and a vendor specific read channel for processing a read signal generated by the head, the method comprising:
executing a generic read channel interface procedure call for interfacing with the vendor specific read channel, the generic read channel interface procedure call having an input parameter comprising a pointer to a data structure, the data structure comprising:
a command ID identifying one of a plurality of routines;
input data for use by the routine identified by the command ID;
a pointer to a data structure for use by the routine identified by the command ID; and
output data returned by the routine identified by the command ID.

12. The method as recited in claim 11, wherein the command ID identifies a routine for setting an operating mode of the read channel.

13. The method as recited in claim 11, wherein the command ID identifies a routine for initializing the read channel.

14. The method as recited in claim 11, wherein the command ID identifies a routine for selecting a read bias for the head.

15. The method as recited in claim 11, wherein the command ID identifies a routine for reading repeatable runout (RRO) data from the disk.

16. The method as recited in claim 11, wherein the command ID identifies a routine for writing repeatable runout (RRO) data to the disk.

17. The method as recited in claim 11, wherein the command ID identifies a routine for returning a vendor ID of the read channel.

18. The method as recited in claim 11, wherein the command ID identifies a routine for returning a variable gain amplifier (VGA) setting for the head.

19. The method as recited in claim 11, wherein the disk drive further comprises a vendor specific preamp for amplifying the read signal, the method further comprising executing a generic set power mode procedure call for setting a power mode of the vendor specific preamp, wherein the generic set power mode procedure call includes an input constant selected from a mode group comprising:
0x00—corresponding to a sleep mode; and
0x01—corresponding to a normal mode.

20. A method of operating a disk drive, the disk drive comprising a disk, a head actuated over the disk, and a vendor specific preamp for amplifying a read signal generated by the head to generate an amplified read signal, the method comprising executing a generic set power mode procedure call for setting a power mode of the vendor specific preamp, wherein the generic set power mode procedure call includes an input constant selected from a mode group comprising:
0x00—corresponding to a sleep mode; and
0x01—corresponding to a normal mode.

* * * * *